(12) United States Patent
Combs

(10) Patent No.: US 8,486,711 B2
(45) Date of Patent: Jul. 16, 2013

(54) HIGHLY FLUORESCENT MARKERS FOR FLUIDS OR ARTICLES

(75) Inventor: George G. Combs, McMurray, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 1831 days.

(21) Appl. No.: 10/971,825

(22) Filed: Oct. 22, 2004

(65) Prior Publication Data

US 2006/0086924 A1  Apr. 27, 2006

(51) Int. Cl.
*G01N 21/76* (2006.01)

(52) U.S. Cl.
USPC .............. 436/172; 436/109; 528/69; 528/75; 525/528

(58) Field of Classification Search
USPC ....... 436/8, 166; 106/493; 252/301.5; 528/54
See application file for complete search history.

(56) References Cited

U.S. PATENT DOCUMENTS

| | | | |
|---|---|---|---|
| 3,844,965 A | 10/1974 | Brown | |
| 4,162,274 A * | 7/1979 | Rosenkranz | 528/75 |
| 4,235,730 A | 11/1980 | Schlicht | 252/51.5 |
| 4,284,729 A | 8/1981 | Cross et al. | |
| 4,303,701 A | 12/1981 | Torgersen et al. | |
| 4,329,378 A | 5/1982 | Tarumi et al. | |
| 4,456,707 A * | 6/1984 | Hille et al. | 521/99 |
| 4,824,888 A | 4/1989 | Emmerling et al. | |
| 4,846,846 A | 7/1989 | Rekers et al. | |
| 4,897,087 A | 1/1990 | Blain et al. | |
| 4,939,226 A | 7/1990 | Schipfer et al. | 528/54 |
| 5,057,122 A | 10/1991 | Blain et al. | |
| 5,201,921 A | 4/1993 | Luttermann et al. | |
| 5,498,808 A | 3/1996 | Smith | |
| 5,525,654 A | 6/1996 | Podola et al. | |
| 5,804,447 A | 9/1998 | Albert et al. | |
| 5,998,211 A | 12/1999 | Albert et al. | |
| 6,312,958 B1 | 11/2001 | Meyer et al. | |
| 6,384,130 B1 | 5/2002 | Pantone et al. | |
| 6,403,702 B1 | 6/2002 | Markusch et al. | |
| 2003/0049457 A1 | 3/2003 | Munzmay et al. | 428/422.8 |
| 2004/0231561 A1 * | 11/2004 | Kaul et al. | 106/493 |

FOREIGN PATENT DOCUMENTS

| | | |
|---|---|---|
| EP | 759 451 A2 | 2/1997 |
| WO | 01/55237 A1 | 8/2001 |
| WO | 03/006523 A1 | 1/2003 |

* cited by examiner

*Primary Examiner* — Robert Xu
(74) *Attorney, Agent, or Firm* — N. Denise Brown; John E. Mrozinski, Jr.

(57) ABSTRACT

The present invention provides highly fluorescent markers, made from a reactive polymer and an isocyanate, that fluoresce in the ultraviolet or near infrared region without being visible to the human eye at low concentrations in the fluid or article being marked. The molecular weight and fluorescence emission wavelength of these highly fluorescent marker compounds can be adjusted to provide a multitude of markers with unique fluorescence signatures.

18 Claims, No Drawings

HIGHLY FLUORESCENT MARKERS FOR FLUIDS OR ARTICLES

FIELD OF THE INVENTION

The present invention relates, in general, to fluorescent marker molecules and, more specifically, to the preparation of highly fluorescent polyurethane compounds which are the reaction products of an isocyanate with fluorescent or non-fluorescent reactive polymers. These highly fluorescent polyurethane compounds provide unique markers for identifying the sources of component raw materials in fluids, fluid blends and solid compositions.

BACKGROUND OF THE INVENTION

Various colorants and dyes have been used to authenticate the composition and/or source of fluids and plastic articles. In some cases, it is preferable to use a marker or tag that is not detectable by the human eye so as to avoid interference with colored materials or to avoid detection of the additive. In such cases, it may be desirable to use marker compounds containing fluorophores that fluoresce or emit light in the ultraviolet or infrared region after excitation with an appropriate light source. For instance, U.S. Pat. Nos. 4,303,701 and 4,329,378 disclose methods for marking plastic lenses by impregnating them with fluorescent materials that do not respond to sunlight or normal visible light. Luttermann et al., in U.S. Pat. No. 5,201,921 teach a process for identifying polyolefin plastics using lipophilic fluorescent dyes in concentrations suitable to minimize color distortions.

Markers are also becoming particularly important for protecting brand integrity for consumers. Such markers must be readily detectable at relatively low concentrations in the product. In the petroleum industry, markers are also useful for ensuring compliance with governmental regulations. For example, products such as diesel fuels, gasoline and heating oils often contain visible dyes or colorless fluorescent compounds that identify the intended use, tax status, or brand name of the product. Such markers are well known to those skilled in the art.

In addition, petroleum product markers must also fulfill other criteria such as being:
(1) soluble in hydrocarbon solvents;
(2) resistant to leaching from the petroleum product by water or water that is strongly acidic or basic;
(3) relatively chemically inert so as to avoid loss of color or fluorescence when in contact with other petroleum additives or water; and
(4) free from interference from naturally occurring compounds already present in the petroleum product.

A number of artisans have attempted to provide acceptable fluorescent markers for use in the petroleum industry. For example, Smith, in U.S. Pat. No 5,498,808, teaches the use of colorless fluorescent petroleum markers which are based on esterified derivatives of xanthene compounds such as fluorescein. One drawback to the markers of Smith is that fuels containing these markers must be treated with alkaline developing solutions to generate the visibly fluorescent chromophore. Other markers such as the phthalocyanine and naphthalocyanine dyes, disclosed in U.S. Pat. Nos. 5,804,447, 5,998,211 and 6,312,958, can be detected directly by their fluorescence in the near infrared (IR) region between 600 to 1,200 nm where naturally occurring components in the petroleum product will not interfere.

Carbamates or urethanes prepared with aromatic isocyanates are known to fluoresce in the ultraviolet region between 300 and 400 nm depending upon the substitution pattern of the isocyanate, solvent, and the alcohol used. Because petroleum compounds typically exhibit considerable background fluorescence at these wavelengths, urethanes have heretofore tended to be excluded from consideration as markers.

U.S. Pat. Nos. 3,844,965 and 4,897,087 disclose lubricating oil additives and ashless fuel detergents or dispersants which are said to be the reaction products of a polyether polyol and an aliphatic hydrocarbyl amine or polyamine with a polyisocyanate (i.e., polyether urethaneureas). Polyether urethane polyamines prepared from hydroxyalkylated polyamines, a polyisocyanate, and a polyether can be used as fuel additives with enhanced oxidative stability as taught by Blain et al. in U.S. Pat No. 5,057,122. However no mention is made in any of these patents about the use of these compounds as fluorescent markers and no methods of enhancing their fluorescent response is discussed.

Polyether polyurethanes without active hydrogens have been used as plasticizers in U.S. Pat. Nos. 4,824,888, 5,525,654, and 6,403,702. These compounds are essentially diurethanes prepared by:
1) reaction of difunctional polypropylene glycol with a monoisocyanate or
2) reaction of a monofunctional monalkyl ether of polypropylene glycol with a diisocyanate.

Pantone et al., in U.S. Pat. 6,384,130, disclose another class of plasticizers that are the reaction products of an isocyanate-terminated prepolymer and a monofunctional alcohol. These compounds contain more than two urethane groups and the prepolymers may have a functionality greater than 2.0. The polyethers disclosed by Pantone et al. to make the polyurethanes do not contain fluorophores.

Reactive dyestuffs or colorants for plastics based on alkoxylated chromophores such as azo, triphenylmethane, and anthraquinone derivatives are disclosed in U.S. Pat. Nos. 4,284,729 and 4,846,846. The polyether derivatives provide non-migrating visible color to polyurethane articles by chemically reacting with isocyanates in the blend to become part of the polymer network. Again, no mention is made in any of these patents about the use of these compounds as fluorescent markers and no methods of enhancing or controlling their fluorescent response is discussed.

Thus, a need continues to exist in the art for colorless markers. It would be desirable if such markers had molecular structures that can be readily modified to provide fluorescence in the ultraviolet, visible, or near infrared (IR) region of the electromagnetic spectrum.

SUMMARY OF THE INVENTION

The present invention provides such markers in the form of highly fluorescent polymeric urethane or urea derivatives that fluoresce in the ultraviolet or near infrared region without being visible to the human eye at low concentrations in the fluid or article being marked. These highly fluorescent markers can be detected by techniques such as liquid or gel permeation chromatography coupled with appropriate detectors. The marker compounds are compatible with an extensive variety of materials, including petroleum products. The molecular weight and fluorescence emission wavelength of the compounds can be readily adjusted to provide a multitude of markers having unique fluorescence signatures. In addition, because the marker compounds are highly fluorescent, less of the particular compound is needed to provide an identifying signal.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention provides a highly fluorescent compound containing the reaction product of at least one fluorophore-containing reactive polymer, optionally containing a polyamine unit of the formula $NCH_2CH_2N$ and at least one unsubstituted or substituted aryl isocyanate or an unsubstituted or substituted aliphatic or cycloaliphatic isocyanate, at an isocyanate index of 100 or less, wherein the highly fluorescent compound emits fluorescence in the ultraviolet (UV), visible, or near infrared (IR) region.

The present invention further provides a process for producing a highly fluorescent compound involving reacting at least one fluorophore-containing reactive polymer, optionally containing a polyamine unit of the formula $NCH_2CH_2N$ and at least one unsubstituted or substituted aryl isocyanate or an unsubstituted or substituted aliphatic or cycloaliphatic isocyanate, at an isocyanate index of 100 or less, wherein the highly fluorescent compound emits fluorescence in the ultraviolet (UV), visible, or near infrared (IR) region.

The present invention still further provides a process for marking one of a fluid, a fluid blend or a solid composition, involving adding to the one of a fluid, a fluid blend or a solid, the reaction product of at least one fluorophore-containing reactive polymer, optionally containing a polyamine unit of the formula $NCH_2CH_2N$ and at least one unsubstituted or substituted aryl isocyanate or an unsubstituted or substituted aliphatic or cycloaliphatic isocyanate, at an isocyanate index of 100 or less, wherein the reaction product emits fluorescence in the ultraviolet (UV), visible, or near infrared (IR) region.

The present invention yet further provides a process for marking one of a fluid, a fluid blend or a solid composition, involving adding to the one of a fluid, a fluid blend or a solid, the reaction product of at least one non-fluorophore-containing reactive polymer, optionally containing a polyamine unit of the formula $NCH_2CH_2N$ and at least one unsubstituted or substituted aryl isocyanate, at an isocyanate index of 100 or less, wherein the reaction product emits fluorescence in the ultraviolet (UV), visible, or near infrared (IR) region.

The highly fluorescent inventive polymeric urethane or urea derivatives fall into two classes depending upon the fluorescence characteristics of the active hydrogen compound and the type of isocyanate used.

Class I. The reaction product of a reactive polymer containing a fluorescent chromophore and an aromatic isocyanate, represented by the formula (I) below:

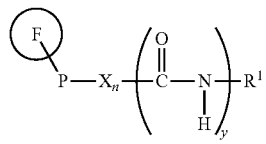

(I)

wherein,
F represents a fluorophore;
P represents a polymeric moiety, optionally containing a polyamine unit of the formula $NCH_2CH_2N$;
x represents a reactive heteroatom chosen from O, N, and S;
n represents the number of reactive heteroatoms;
$R^1$ represents an unsubstituted or substituted aryl moiety; and
y represents the number of isocyanate groups.

Class II. The reaction product of a reactive polymer containing a fluorescent chromophore and an aliphatic or cycloaliphatic isocyanate, represented by the formula (II) below:

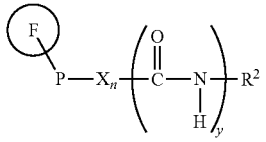

(II)

wherein,
F represents a fluorophore;
P represents a polymeric moiety, optionally containing a polyamine unit of the formula $NCH_2CH_2N$;
x represents a reactive heteroatom chosen from O, N, and S;
n represents the number of reactive heteroatoms;
$R^2$ represents an unsubstituted or substituted aliphatic or cycloaliphatic moiety; and
y represents the number of isocyanate groups.

Also suitable as markers in the inventive methods are those polymeric urethane or urea derivatives which do not contain a fluorophore, but do contain an aromatic group in the isocyanate moiety, and are herein designated as Class III compounds.

Class III. The reaction product of a reactive polymer not containing a fluorescent chromophore and an aromatic isocyanate, represented by the formula (III) below:

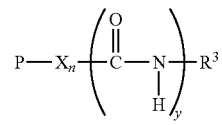

(III)

wherein,
represents a non-fluorophore-containing polymeric moiety, optionally containing a polyamine unit of the formula $NCH_2CH_2N$;

x represents a reactive heteroatom chosen from O, N, and S;

n represents the number of reactive heteroatoms;

$R^3$ represents an unsubstituted or substituted aryl moiety; and y represents the number of isocyanate groups.

The highly fluorescent marker compounds of these three classes preferably have a molecular weight greater than 300 Da, more preferably between 1,000 and 50,000. The excitation wavelength to induce fluorescence is preferably greater than 210 nm and the emission wavelength is preferably greater than 290 nm. Surprisingly, the relative fluorescence of the marker compounds is greater than that expected from the simple addition of the fluorescence of the reactant fluorophores and, in some cases, may be up to seven times as much as expected. This allows for the use of greatly reduced amounts of the compounds as markers.

It is preferred that neither the reactive polymer nor the isocyanate absorb light in the visible region to the extent that any significant color is observed, but the reaction product may fluoresce in the ultraviolet below 400 nm, in the visible region, or in the near infrared above 700 nm. The highly fluorescent marker compounds are not intended to become chemically bound to the matrix in which they are used.

The chemical composition of the reactive polymer is not critical, but the reactive polymer should be soluble in the matrix in which it is to be used. Although polyesters are suitable, polyethers based on alkylene oxides or combinations of alkylene oxides such as ethylene oxide, propylene oxide, or butylenes oxide are preferred. The molecular weight of the reactive polymer should be such that the fluorescence intensity of its reaction product with an isocyanate allows detection of the compound at concentrations below 100 ppm. Preferably, the reactive polymer has a molecular weight in the range of 250 to 40,000 Da, more preferably in the range of 500 to 20,000 Da. Additionally, the functionality or number of active hydrogen atoms per molecule of reactive polymer may vary from 1 to 8. The chain length of the reactive polymer and the fluorophore may be chosen to adjust respectively the chromatographic behavior and fluorescent emission wavelength for the compound as desired. Reactive heteroatoms as used herein refers to oxygen, nitrogen or sulfur atoms of the reactive polymer which had reactive hydrogen atoms prior to reaction with the isocyanate in forming the highly fluorescent compound.

Fluorophores and methods of making them are known in the art. The fluorophore may be attached to the reactive polymer via any type of linking group such as an ester, amide, ether, etc., by means known to those skilled in the art.

In the case of the inventive Class I or the Class III compounds, the aromatic isocyanate may be mono or polyfunctional depending upon the desired molecular architecture of the reaction product. Suitable isocyanates include, but are not limited to, 4,4'- diphenylmethane diisocyanate (MDI), polymeric MDI (PMDI), toluene diisocyanate, allophanate-modified isocyanates, phenyl isocyanate, naphthalene isocyanate, naphthalene diisocyanate, isocyanate-terminated prepolymers and carbodiimide-modified isocyanates.

In the case of the inventive Class II compounds, suitable aliphatic or cycloaliphatic isocyanates include, but are not limited to, 1,6-hexamethylene-diisocyanate; isophorone diisocyanate; 2,4- and 2,6-hexahydrotoluenediisocyanate, as well as the corresponding isomeric mixtures; 4,4'-, 2,2'- and 2,4'-dicyclohexylmethanediisocyanate and 1,3 tetramethylene xylene diisocyanate.

As will be apparent to those skilled in the art, the inventive marker compounds may be made including various combinations of reactive polymers and isocyanates.

For the inventive marking methods, it is preferred that the highly fluorescent marker compounds be liquid and readily soluble in fluids. Therefore, those conditions which would produce high crosslink density or insoluble solids are preferably avoided, i.e., where n, in formulae (I), (II) or (III) is greater than one, a monofunctional isocyanate is preferred and where y is greater than one, a monofunctional polymer is preferred. If use of a diisocyanate is desired for n>1, a mixture of mono- and difunctional polymeric group is preferably used to control the molecular weight of the polyurethane product. The isocyanate index for reaction of the polymer with the isocyanate is less than or equal to 100 but a value of 100 is preferred.

The term "Isocyanate Index" (also commonly referred to as NCO index), is defined herein as the number of equivalents of isocyanate, divided by the total number of equivalents of isocyanate-reactive hydrogen containing materials, multiplied by 100, (i.e., NCO/(OH+NH)×100).

The fluorescence signature of the marker compounds may be adjusted by varying the chain length of the polymeric group, the presence or absence of fluorophore and the type of fluorophore. The highly fluorescent marker compounds may be added to the matrix to be marked in any amount depending upon the sensitivity of the detection system. The inventor herein contemplates that, with present technologies, detection may be effected at amounts of at least one part of the inventive compound per billion parts of matrix up to perhaps 100 parts per million. The matrix to be marked is virtually unlimited. Fluids, fluid blends and solid compositions (preferably before solidification has occurred) may be marked with the inventive compounds. The highly fluorescent marker compounds may be used to mark fluid blends, such as petroleum products including diesel fuel, gasoline and heating oil. Although less preferred because of a weaker signal, the inventor herein also contemplates the use of a fluorophore-containing polymer itself in the inventive marking methods.

EXAMPLES

The present invention is further illustrated, but is not to be limited, by the following examples.

Highly Fluorescent Marker Preparation Procedure

An apparatus was assembled from a three-liter resin kettle with a four-necked glass cover. A metal stirrer shaft with three Rushton turbines was inserted into the central neck. The other necks were fitted with a thermocouple, a nitrogen line, and a vacuum line. The resin kettle was inserted into a heating mantle jacket. The assembly was flushed with nitrogen for 15 minutes before charging 2,370 grams (1.483 equivalents) of polyether polyol to the resin kettle. The polyether was vacuum-stripped at 20-25 mm Hg while heating to 110° C. for two hours. The polyol was cooled to 60° C. before sufficient isocyanate was added to achieve the desired index. The mixture was heated for two to four hours at 125° C. under a nitrogen blanket. Consumption of the isocyanate was monitored by standard titration methods. The isocyanate index was varied from 90 to 100 and the amount of each reactant was dependent upon its active hydrogen content.

Fluorescence Analysis Method

High Performance Liquid Chromatography (HPLC) analyses of the highly fluorescent marker compounds were performed using a Model 1090M HPLC (Agilent Technologies) equipped with a Model 1046A Fluorescence detector. A five microliter aliquot of a 100 ppm solution of each marker compound was injected into the HPLC, which contained no analytical column and used unstabilized THF as mobile phase at a flow rate of 0.5 milliliters per minute. Because no analytical column was used, all components of each sample were unretained by the system and eluted together.

The fluorescent responses were monitored primarily at three specified wavelength combinations, namely: Excitation at 240 nm/Emission at 325 nm; Excitation at 240 nm/Emission at 310 nm; and Excitation at 230 nm/Emission at 310 nm. The photomultiplier tube (PMT) sensitivity was set at 8. Comparisons of marker compounds responses were based on peak area data.

Peak areas for the emission spectra of the marker compounds were compared to the peak area for a control to obtain the relative response ratio. The control was a polyether prepared by propoxylating nonylphenol. Although there was little difference in the response ratios when the excitation wavelength was 230 nm, various combinations of polymer fluorophores and aromatic isocyanates enhanced responses from two to nine times when excitation at 240 nm was used.

Table 1 details the composition of the highly fluorescent marker compounds and summarizes the results of fluorescence measurements performed at various combinations of excitation and emission wavelengths. The molecular weights listed correspond to the unreacted polymer.

meric mixtures thereof, 4,4'-, 2,2'- and 2,4'-dicyclohexylmethanediisocyanate and 1,3-tetramethylene xylene diisocyanate;
at an isocyanate index of 100 or less,
wherein the highly fluorescent compound emits fluorescence in the ultraviolet (UV), visible, or near infrared (IR) region wherein the reactive polymer is chosen from polyesters and polyether polyols.

2. The liquid, highly fluorescent compound according to claim 1, wherein the fluorophore of the fluorophore-containing reactive polymer is chosen from nonylphenol and Bisphenol A.

3. The liquid, highly fluorescent compound according to claim 1, wherein the reactive polymer has a molecular weight of about 500 to about 20,000 Da.

4. The liquid, highly fluorescent compound according to claim 1, wherein the unsubstituted or substituted aryl isocyanate is chosen from 4,4'-diphenylmethane diisocyanate (MDI), polymeric MDI, toluene diisocyanate, allophanate-modified isocyanates, phenyl isocyanate, naphthalene isocyanate, naphthalene diisocyanate, isocyanate-terminated prepolymers and carbodiimide-modified isocyanates.

5. The liquid, highly fluorescent compound according to claim 1, wherein the compound has an excitation wavelength

TABLE I

| | | | | | | Fluorescence in THF | | | | | |
|---|---|---|---|---|---|---|---|---|---|---|---|
| | | | | | | Excitation 230 nm Emission | | Excitation 240 nm Emission | | Excitation 240 nm Emission | |
| Highly Fluorescent Marker Compound | | | | | | | | | | | |
| Reactive Polymer | | | Isocyanate | | | 310 nm | | 310 nm | | 325 nm | |
| Ex. No. | Fluorophore | Funct. | MW | | Funct. | Area | Ratio | Area | Ratio | Area | Ratio |
| C-1 | nonylphenol | 1 | 1,600 | none | — | 592 | 1.0 | 108 | 1.0 | 54 | 1.0 |
| 2 | nonylphenol | 1 | 1,600 | 4,4'-MDI | 2 | 856 | 1.4 | 721 | 6.7 | 476 | 8.8 |
| 3 | nonylphenol | 1 | 1,600 | phenyl isocyanate | 1 | 789 | 1.3 | 211 | 2.0 | 105 | 1.9 |
| 4 | Bisphenol A | 2 | 3,000 | phenyl isocyanate | 1 | 1,023 | 1.7 | 344 | 3.2 | 185 | 3.4 |
| 5 | Bisphenol A | 2 | 3,000 | 1-napthyl isocyanate | 1 | 704 | 1.2 | 200 | 1.9 | 493 | 9.1 |
| 6 | none | 1 | 1,600 | phenyl isocyanate | 1 | 165 | 0.3 | 126 | 1.2 | 62 | 1.1 |
| 7 | none | 1 | 1,600 | 4,4'-MDI | 2 | 298 | 0.5 | 506 | 4.7 | 320 | 5.9 |

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A liquid, highly fluorescent compound comprising the reaction product of:
at least one fluorophore-containing reactive polymer, said reactive polymer being prepared from monomers having no more than one 1,2-epoxide group per molecule, having a molecular weight in the range of 250 to 40,000 Da, and having from 1 to 8 active hydrogen atoms per molecule of reactive polymer, and optionally containing a polyamine unit of the formula $NCH_2CH_2N$; and
at least one unsubstituted or substituted aryl isocyanate or an unsubstituted aliphatic or cycloaliphatic isocyanate, wherein said unsubstituted aliphatic or cycloaliphatic isocyanate is selected from the group consisting of 1,6-hexamethylene-diisocyanate, isophorone diisocyanate, 2,4- and 2,6-hexahydrotoluene-diisocyanate and isoto induce fluorescence of greater than about 210 nm and an emission wavelength of greater than about 290 nm.

6. The liquid, highly fluorescent compound according to claim 1, wherein the compound has a molecular weight greater than about 300 Da.

7. The liquid, highly fluorescent compound according to claim 1, wherein the compound has a molecular weight of from about 1,000 Da to about 50,000 Da.

8. A process for producing a liquid, highly fluorescent compound comprising reacting:
at least one fluorophore-containing reactive polymer, said reactive polymer being prepared from monomers having no more than one 1,2-epoxide group per molecule, having a molecular weight in the range of 250 to 40,000 DA, and having from 1 to 8 active hydrogen atoms per molecule of reactive polymer, and optionally containing a polyamine unit of the formula $NCH_2CH_2N$; and
at least one unsubstituted or substituted aryl isocyanate or an unsubstituted aliphatic or cycloaliphatic isocyanate, wherein said unsubstituted aliphatic or cycloaliphatic isocyanate is selected from the group consisting of 1,6-hexamethylene-diisocyanate, isophorone diisocyanate, 2.4- and 2,6-hexahydrotoluene-diisocyanate and isometric mixtures thereof, 4,4'-, 2,2'- and 2,4'-dicyclohexylmethanediisocyanate and 1,3-tetramethylene xylene diisocyanate;
at an isocyanate index of about 100 or less,
wherein the highly fluorescent compound emits fluorescence in the ultraviolet (UV), visible, or near infrared (IR) region wherein the reactive polymer is chosen from polyesters and polyether polyols.

9. The process according to claim 8, wherein the fluorophore of the fluorophore-containing reactive polymer is chosen from nonylphenol and Bisphenol A.

10. The process according to claim 8, wherein the reactive polymer has a molecular weight of about 500 to about 20,000 Da.

11. The process according to claim 8, wherein the unsubstituted or substituted aryl isocyanate is chosen from 4,4'-diphenylmethane diisocyanate (MDI), polymeric MDI, toluene diisocyanate, allophanate-modified isocyanates, phenyl isocyanate, naphthalene isocyanate, naphthalene diisocyanate, isocyanate-terminated prepolymers and carbodiimide-modified isocyanates.

12. The process according to claim 8, wherein the highly fluorescent compound has an excitation wavelength to induce fluorescence of greater than about 210 nm and an emission wavelength of greater than about 290 nm.

13. The process according to claim 8, wherein the highly fluorescent compound has a molecular weight greater than about 300 Da.

14. The process according to claim 8, wherein the highly fluorescent compound has a molecular weight of from about 1,000 Da to about 50,000 Da.

15. A liquid, highly fluorescent compound made by reacting:
at least one fluorophore-containing reactive polymer, said reactive polymer being prepared from monomers having no more than one 1,2-epoxide group per molecule, having a molecular weight in the range of 250 to 40,000 Da, and having from 1 to 8 active hydrogen atoms per molecule of reactive polymer, and optionally containing a polyamine unit of the formula NCH$_2$CH$_2$N;
and
at least one unsubsituted or substituted aryl isocyanate or an unsubstituted aliphatic or cycloaliphatic isocyanate, wherein said unsubstituted aliphatic or cycloaliphatic isocyanate is selected from the group consisting of 1,6-hexamethylene-diisocyanate, isophorone diisocyanate, 2.4- and 2,6-hexahydrotoluene-diisocyanate and isometric mixtures thereof, 4,4'-, 2,2'- and 2,4'-dicyclohexylmethanediisocyanate and 1,3-tetramethylene xylene diisocyanate; at an isocyanate index of about 100 or less, wherein the highly fluorescent compound emits fluorescence in the ultraviolet (UV), visible, or near infrared (IR) region wherein the reactive polymer is chosen from polyesters and polyether polyols.

16. The liquid, high fluorescent compound of claim 1 which corresponds to the structure:

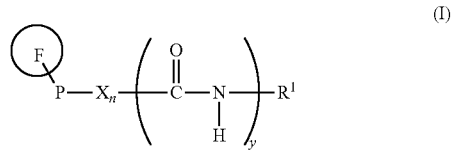

(I)

wherein
F represents a fluorophore;
P represents a polymeric moiety prepared from monomers having no more than one 1,2-epoxide group per molecule, optionally containing a polyamine unit of the formula NCH$_2$CH$_2$N;
X represents a reactive heteroatom chosen from O, N, and S;
n represents the number of reactive heteroatoms;
R$^1$ represents an unsubstituted or substituted aryl moiety; and
y represents the number of isocyanate groups.

17. The liquid, highly fluorescent compound according to claim 1, wherein said polyether polyols are prepared one or more alkylene oxides comprising ethylene oxide, propylene oxide, butylene oxides and combinations thereof.

18. The process according to claim 8, wherein said polyether polyols are prepared one or more alkylene oxides comprising ethylene oxide, propylene oxide, butylene oxides and combinations thereof.

* * * * *